United States Patent [19]

Scheyhing et al.

[11] 4,094,378
[45] June 13, 1978

[54] VEHICLE CONSTANT SPEED CONTROL CIRCUIT

[75] Inventors: Hans Scheyhing, Leonberg; Helmut Fleischer; Karl-Ludwig Abend, both of Schwieberdingen, all of Germany

[73] Assignee: Robert Bosch GmbH, Stuttgart, Germany

[21] Appl. No.: 705,923

[22] Filed: Jul. 16, 1976

[30] Foreign Application Priority Data

Aug. 22, 1975 Germany .............................. 2537415

[51] Int. Cl.² .............................................. B60K 31/00
[52] U.S. Cl. .................................. 180/105 E; 123/102
[58] Field of Search ................ 180/105 E; 123/102 R; 340/53; 317/5

[56] References Cited

U.S. PATENT DOCUMENTS

| | | | |
|---|---|---|---|
| 3,580,355 | 5/1971 | Kitano et al. | 180/105 E |
| 3,766,895 | 10/1973 | Voss et al. | 123/102 |
| 3,820,624 | 6/1974 | Sakakibara | 180/105 E |
| 3,885,644 | 5/1975 | Seidler et al. | 180/105 E |
| 3,983,954 | 10/1976 | Noddings | 180/105 E |

*Primary Examiner*—Joseph F. Peters, Jr.
*Assistant Examiner*—Terrance L. Siemens
*Attorney, Agent, or Firm*—Flynn & Frishauf

[57] ABSTRACT

To prevent hunting in an automatic vehicle speed maintenance circuit having a closed control loop, the control element is so arranged that the controller has not only proportional, but additionally derivative control characteristics to increase the response speed while permitting loop amplification which is necessary in view of the response delay characteristic of the controlled element, namely the vehicle itself.

10 Claims, 1 Drawing Figure

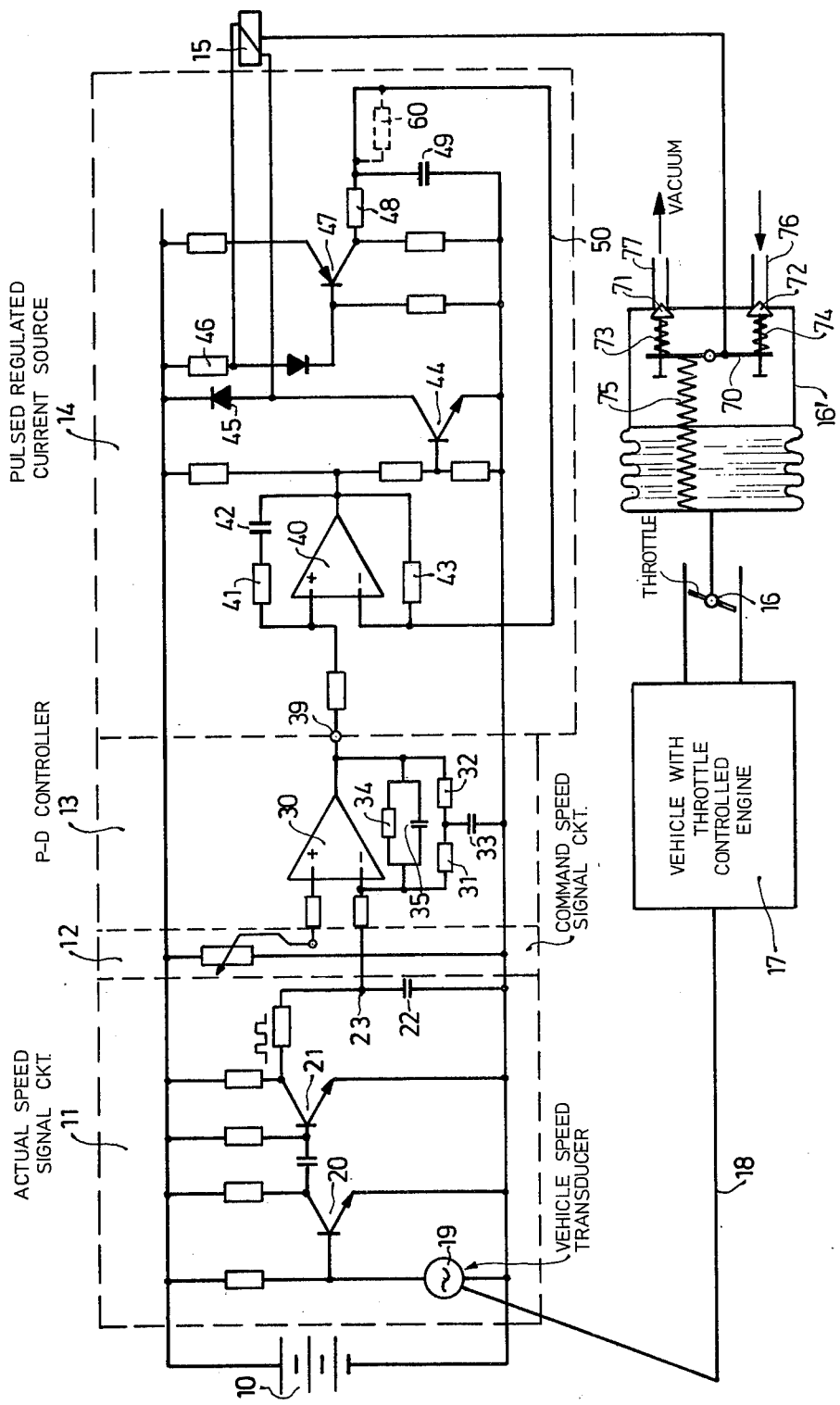

VEHICLE CONSTANT SPEED CONTROL CIRCUIT

The present invention relates to a constant speed vehicle control system, and more particularly to such a system which includes a servo loop in which a speed-responsive signal is compared with a desired speed command signal and, in dependence on the difference of the two signals, an error positioning signal is generated which controls a proportional controller. Due to the characteristics of the controlled element, namely an internal combustion engine and an automotive vehicle, the delay between control action (for example change in fuel supply) and control response is slow. The controlled element itself may, for example, be the throttle of an automotive internal combustion engine.

A previously proposed servo controller uses an electropneumatic control system. It has a membrane defining a chamber at one side, in which one duct is connected to a source of vacuum and another duct connected to a source of pressure, for example normal ambient air pressure. The two ducts are alternately connected to the membrane chamber by means of valves which are suspended, in the form of a double-arm lever, the position of which is electromagnetically controlled. The electromagnet receives a pulse-type positioning signal of constant frequency but variable duty cycle so that, in dependence on the duty cycle, the pressure (or, rather, the vacuum) in the chamber and hence the position of the membrane can be controlled. The membrane, in turn, is connected to the throttle of the automotive vehicle engine.

The positioning system described uses an internal feedback in the form of a spring connecting the membrane with the double-arm lever. This avoids the necessity of other types of systems in which, for example, the membrane position is sensed electrically in order to provide a signal proportional to the control excursion path for feedback to the control input. Generating such a signal requires excessive electrical components, hence is expensive and, due to the location of the system within the motor space of the vehicle, is subject to malfunction. A positioning system using a spring as a feedback element introduces a comparatively long delay time of response.

The response time of the system can be compensated by suitable arrangement of the electronic controller. In systems, as proposed, the controller provides a positioning signal which depends on the deviation of actual vehicle speed from commanded vehicle speed. Such proportional controllers provide and output in which the rate of change in the position signal is proportional to the amplification of the controller. The deviation of the control position from a desired value is small if the controller quickly provides a positioning signal to counteract a deviation from the commanding speed. Thus, a controller with a high amplification factor would be desirable. High amplification — theoretically desirable — will decrease continuously remaining deviations from commanded conditions, that is, commanded speed, also in a proportional controller. Increasing the amplification unfortunately, however, decreases the proportionality range of the controller. Starting from a certain critical value, oscillations of the controller are practically unavoidable. In actual practice it has been found that a proportional controller which, by and itself, can be constructed in relatively inexpensive form, does not meet the requirements of the special application for vehicle speed control since large error signals at low amplification would result in excessive deviations from commanded value whereas, with high amplification, the control loop may become unstable. The vehicle itself may be subjected to sudden and comparatively large deviations from the commanded signal, for example by sudden changes in road conditions, wind conditions, or the like.

It is an object of the present invention to provide a controller for a speed control system having an internal feedback and connected to a control loop with an inherent delay response time which responds rapidly and which permits only small deviations of actual vehicle speed from commanded vehicle speed without being subject to instability or oscillations.

Subject matter of the present invention

Briefly, without essentially changing the components of the system, the controller is a controller which has proportional and derivative characteristics, that is, by a proportional-derivative (PD) controller.

Due to the derivative portion or characteristics of such a controller, corrective action is initiated by the controller much sooner than in controllers of the prior art used in the control loops upon changes in error signal, so that hunting and excessive deviation are avoided. This controller permits use of an amplifier with higher amplification than previously so that the remaining, continued deviation from commanded performance, that is, from commanded speed can be reduced without oscillations being introduced into the control loop.

Proportional-derivative (PD) controllers can readily be instrumented by using an operational amplifier having a real feedback circuit, to which the input voltage is supplied over a parallel circuit of a resistor and a capacitor. Upon substantial changes of the input quantities, which may arise upon substantial changes in loading on the engine, the PD controller may, however, be subject to erroneous outputs due to excessive control or saturation. Such errors cannot be tolerated, but can be avoided when, in accordance with a feature of the invention, the controller includes a feedback with a T-feedback circuit having two resistors in series and a capacitor connected to the junction of the resistors. The capacitor may have substantial value and an electrolytic capacitor can readily be used since the polarity of the voltage will not change and is fixed.

High-frequency deviation signals might result in large changes of the control signals due to the derivative response characteristics of the controller. Such high-frequency signals should not, however, affect the response and, in accordance with another feature of the invention, a smoothing filter with suitable time constant is provided in the input, for example formed as an R/C circuit connected to the input of the controller itself. The circuit can be simplified further if a second feedback circuit is used with the controller which includes a parallel R/C circuit forming an active smoothing filter for high frequencies.

The invention will be described by way of example with reference to the accompanying drawing, wherein the single FIGURE is a schematic circuit diagram illustrating an automatic vehicle constant speed control circuit including the PD controller in accordance with the present invention.

A source of supply 10, for example the battery of an automotive vehicle, is connected to a group of circuits, shown in outlines in broken lines: Block 11 is an actual speed signal circuit which provides an output signal representative of actual vehicle speed; block 12 is a command speed signal circuit which provides a command signal representative of commanded speed. The PD controller is shown in block 13. Block 14 is a pulse-type regulated current source which operates an electropneumatic positioning element controlled by a magnetic solenoid 15. Solenoid 15 controls a vacuum controller 16', as well known, which in turn is connected to an element controlling the engine of the vehicle, for example throttle 16. The vehicle and its engine are schematically indicated by block 17. The drive shaft of the vehicle is schematically indicated at 18 and is coupled to a tachometer generator 19 which provides an output signal proportional to vehicle speed.

Specifically, the circuit includes the following elements: The output signal of actual speed signal circuit 11 is a d-c signal representative of engine speed. Tachometer generator 19 provides alternating output signals which periodically block the normally saturated transistor 20. Its collector will, therefore, have a square wave signal appear thereat. This signal is processed in transistor 21 to provide square wave output signals of constant pulse duration, but varying pulse gaps. An R/C circuit forms an arithmetic means; capacitor 22 then will have a representative charge appear thereat, corresponding to the arithmetic mean of the duty cycle of transistor 21. The output 23 of actual speed signal circuit 11 then will be a d-c signal, the amplitude of which is representative of vehicle speed.

Command speed signal circuit 12 simply is a potentiometer, for example coupled to a speed setting knob, to the speed indicator of the vehicle, or the like, to be set when a certain speed has been reached, or the like. The output of command speed signal circuit 12 will be a d-c voltage representative of commanded speed.

The PD controller 13 thus will have two input signals available thereto: one from command speed signal circuit 12 representative of commanded speed, and one from terminal 23 representative of actual vehicle speed. The PD controller 13 has an operational amplifier 30 which has two feedback circuits connecting the output back to the input. One feedback circuit is a T-network formed of resistors 31, 32 and a cross capacitor 33. This network results in PD characteristic of the operational amplifier. A second feedback circuit includes the parallel connection of a resistor 34 and a capacitor 35. The values of resistor 34 and capacitor 35 are so selected that they provide smoothing for high-frequency noise or spurious frequencies. This is necessary since, otherwise, high-frequency spurious signals would generate high positioning signals at the output 39 of the controller 13 due to the portion of the characteristic related to the derivative characteristic.

The output 39 of PD controller circuit 13 is a d-c voltage which is a measure of the error between commanded speed and actual speed.

The output signal at terminal 39 of the PD controller 13 is used to control the pulsing of a pulse-type regulated constant current source. In the example illustrated, it is formed by a pulsed current control unit. An operational amplifier 40 has its direct input connected to a feedback circuit from the output thereof, which includes resistor 41 and capacitor 42. A resistor 43 provides negative feedback to the inverting input of operational amplifier 40. Operational amplifier 40, in the network, forms a pulsing generator, the pulsing frequency of which is essentially controlled by the value of the resistor 41 and capacitor 42. The values of resistor 41 and capacitor 42 are so selected that the output frequency is about 100 Hz. This frequency is suitable; in general, the pulsing frequency of source 14 should be so high that the positioning elements 16', 16 and the vehicle with the throttle-controlled engine 17 cannot follow the pulsing frequency due to the overall inertia of the positioning system and the response unit, i.e., the vehicle engine and vehicle combination.

The output signal from operational amplifier 40, connected in the positive and negative feedback circuits, is connected to a power stage including a power transistor 44. The collector circuit of power transistor 44 is connected to the solenoid 15. A free-wheeling diode 45 is connected in parallel to the solenoid 15 to carry current during the gaps between pulses from transistor 44. A calibrating or measuring resistor 46 is included in series with the solenoid winding 15. The solenoid winding, therefore, is controlled by a series of pulses, or by a pulse train of constant frequency.

The voltage drop across the measuring resistor 46 is proportional to the current flowing through the solenoid winding 15. This voltage drop is applied to a transistor 47 which provides an amplified output signal which is conducted through a smoothing filter including resistor 48 and capacitor 49. The smoothed direct voltage which is representative of the current flowing through the solenoid winding 15 is fed back to the operational amplifier 40 through feedback line 50.

The duty cycle of the signal derived from the output of the operational amplifier 40 depends on the voltage available at the output of the PD controller and on the signal taken across resistor 46 and representative of current flow through solenoid 15. Since the force applied by the solenoid 15, and hence the distance that a core thereof moves, is a function of current flow through the solenoid 15, the element controlling speed is likewise proportionately changed. As the current flow through solenoid 15 changes, therefore, the throttle 16 through the vacuum diaphragm controller 16' is proportionately changed.

Operation: Let it be assumed that the control loop is in balance and that suddenly the speed of the vehicle increases due to an extraneous influence, for example a change in the slope of the road over which the vehicle operates so that the vehicle will operate downhill. The control loop will then function as follows: The frequency of the signal from tachometer generator 19 will increase so that the d-c voltage at the output of circuit 11 will increase. The position of the command speed signal circuit 12 has not changed, however, so that a differential voltage which is not zero will appear at the input to operational amplifier 30. This voltage difference is amplified by operational amplifier 30. Since this operational amplifier operates as a PD, that is, as a proportional action controller with derivative control characteristics, the signal at the output thereof will be substantial as soon as there is a change in the loading on the engine — due to the vehicle now operating downhill, the loading has decreased — which high output signal will decay in time. Initially, the duty cycle of the pulsing constant current supply source 14 will be shifted to a higher value, so that the average d-c current in solenoid 15 will rise. As a result, the throttle 16 of the vehicle is changed in a direction to a lesser fuel supply, tending to decrease the speed of the vehicle.

The loop has this important characteristic: The relatively high delay time in the position controller 16', 16 and the vehicle itself responding to the change in control is compensated effectively by forming the controller 13 as a proportional-derivative controller. The second feedback circuit of resistor 34 and capacitor 35 does not have an integrating effect, so that the control loop will have a remaining control deviation, as in the known control loop. This deviation, however, is much less than before since, in contrast to the known system, the amplification of the controller in the control loop can be substantially increased since, due to the derivative characteristics of the controller, a counteracting positioning signal is generated promptly.

The system uses pulsed current control. Pulsed current control is subjected to substantially less noise and stray influences such as change in supply voltage, change in resistance of the solenoid 15 due to temperature change, and the like. These extraneous changes have no essential influence on the control effect of the overall control loop. To accelerate the control action, and thus the control quality of the loop as a whole, the current source may likewise have proportional-derivative characteristics. This can readily be effected by including a further resistor 60 between the R/C combination 48, 49 and the input of line 50 to the operational amplifier 40. This is shown in broken lines in the FIGURE since it is not strictly necessary; this derivative characteristic of the pulsed current source, however, additionally improves the initial transient response of the controller.

The example shown in the drawing illustrates a speed control circuit based on an analog system. The respective units 11, 12, 13, 14 of the system may all, or selectively be replaced by elements which essentially operate digitially. In digital control loops, the PD controller 13 also will receive proportional-derivative characteristics if the resulting positioning system, including the controlled response element — the vehicle — has a high response delay. The PD characteristic can readily be obtained in a digital system. Two memories are used, each storing a count state representative of the actual speed and the command speed, respectively. The difference between the count states of the two memories, if any, provides the error signal. To provide the PD characteristic, a signal is derived providing a count number representative of the change of the count state of the difference in count number between two storage units per unit time, and linking this change signal, being a digital signal representative of the rate of change per unit time with the actual change, the digital combined signal then controlling the duty cycle of the pulse-regulated current source 14. Thus, again, proportional as well as derivative control is obtained since a rate of change signal is combined with the actual change between commanded and actual speed values. The controller thus has PD characteristics with a second order delay which is caused, on the one hand, by the smoothing filter formed by capacitor 35 and resistor 34 and, on the other, by the parasitic time constant due to the derivative portion of the controller. Such a controller has the outstanding advantage that it requires only little by way of apparatus while the important parameters such as limiting frequency, d-c amplification, damping factor and acceleration factor can be varied almost independently with respect to each other and hence can be independently preset or adjusted.

The output voltage derived from the control amplifier 13 at terminal 39 is a measure representative of the error of actual speed from commanded speed. it is undesirable to supply such a voltage directly to an electromagnetically operated positioning system. Electromagnetic positioning systems provide a positioning path which is proportional to current flowing therethrough. If this current is subjected to spurious interferences, then permanent deviations from the control current may result due to the proportionality characteristics of the control amplifier. Such spurious interference may be caused, for example, by changes in resistance of the solenoid or magnet coil 15 due to changes in temperature, changes in supply voltage, or the like. The effect of these spurious changes can be avoided, thus further increasing the quality of control, by using the pulseregulated current source 14 in which the output voltage of the PD controller 13 is converted into a controlled current proportional to the voltage. The effects of, for example, decresed voltage or temperature and consequent change in resistance of solenoid 15 can thereby be practically eliminated and will no longer have an influence on the control loop so that permanent, remaining and non-transient deviations from the controlled commanded value can be eliminated.

It is desirable to energize coil 15 in pulses in order to improve the power efficiency of the system. The constant current source 14 thus supplies its constant current in pulses; by changing the duty cycle of the pulsed output in dependence of the output voltage at terminal 39 of the PD controller 13, and on the value of the feedback signal, the current in the solenoid will be automatically in balance, independent of variations in supply voltage or changes in resistance of the magnet coil or solenoid 15 itself, the current being then proportional to the output voltage of the control amplifier. The pulsing frequency of the pulseregulated current source is selected to have such a value that the balanced scale closing the ducts in the diaphragm chamber 16', controlled by the solenoid 15, is caused to oscillate only with oscillations of small amplitude, without, however, closing the air ducts fully, or opening them fully wide. A positioning drive can then be used in which a balance lever 70, located within positioning diaphragm 16', resiliently locates two conical valve elements 71, 72 by means of interposed springs 73, 74. The pivot point of double-arm lever 70 and the engagement point of holding spring 75 are so selected that both the vacuum duct 77 as well as the pressure or ambient air duct 76 remain closed although the lever 70 oscillates with a slight amplitude. Thus, when the system is in balance, no air or, rather, vacuum is needed to maintain it in position.

The current flow through coil 15 is sensed by sensing resistor 46; this sensing resistor will also have the inductive current flowing therethrough conducted through free-wheeling diode 45 and flowing in pulse gaps between pulses from current source 14. Thus, the sensing resistor evaluates the entire current flowing through coil 15. The voltage across the sensing resistor, representative of this current, is amplified, filtered, and applied in a feedback circuit back to the pulse-regulated current source amplifier. The filter network formed of capacitors 48, 49 may, additionally, be connected to include a further resistor 60 so that the filter circuit becomes a T-circuit with two longitudinal resistors 48, 60 and a cross capacitor, providing a PD characteristic then also to the amplifier of the pulse-regulated current source.

The system provides a speed control circuit which is simple to construct, needs only few components, and which rapidly responds to deviations of speed from a commanded value in a manner which, considering the inertia of the response of the engine and the vehicle 17, is hardly noticeable by the operator of the vehicle.

Various changes and modifications may be made within the scope of the inventive concept.

We claim:

1. Vehicle constant speed control system to control an engine input to maintain the speed of the vehicle at a commanded value, comprising
   means (11) generating an actual vehicle speed signal;
   means (12) generating a command speed signal;
   means (16) coupled to the engine of the vehicle controlling energy input thereto;
   a controller (13) having proportional-derivative (PD) characteristics comparing said actual speed signal and said command speed signal and generating an error signal;
   and positioning means (14, 15) responsive to the error signal and controlling said energy input control means (16) and hence affecting the speed of the vehicle, said positioning means and said vehicle responding to the error signal, proportionately, with substantial time delay;
   and wherein the PD controller (13) includes a control amplifier (30) having a feedback circuit comprising a T-resistance-capacitance circuit including two serially connected resistors (31, 32) and a cross connected capacitor (33).

2. System according to claim 1, wherein the control amplifier (30) has a second feedback circuit connected thereto comprising a parallel connected resistor (34) and capacitor (35) to form an active smoothing filter to filter high frequencies.

3. Vehicle constant speed control system to control an engine input to maintain the speed of the vehicle at a commanded value, comprising
   means (11) generating an actual vehicle speed signal;
   means (12) generating a commanded speed signal;
   means (16) coupled to the engine of the vehicle controlling energy input thereto;
   a controller (13) comparing said actual speed signal and said commanded speed signal and generating an error signal;
   and positioning means (14, 15) responsive to the error signal and controlling said energy input control means (16) and hence affecting the speed of the vehicle, said positioning means and said vehicle responding to the error signal, proportionally, with substantial time delay, wherein the positioning means includes a regulated current source (14) having an output controlled by said controller (13), said controller providing an output voltage which is transformed into a proportional current by said regulated current source (14);
   and wherein the regulated current source includes a pulsed regulated current source (14) comprising an amplifier (40) having a positive feedback circuit comprising a series connected resistor (41) and capacitor (42).

4. System according to claim 3, wherein said amplifier (40) having said positive feedback circuit is an operational amplifier having two inputs, the direct input being connected to said positive feedback circuit, means (45, 46) coupled to the positioning means (15) and deriving a sensing signal representative of current flowing in the positioning means (15) provided by the regulated current source, said sensing signal being connected to the inverting input of the operational amplifier (40).

5. System according to claim 3, wherein the pulsing rate of the pulsed regulated current source (14) is high with respect to the response speed of the energy input control means (16, 16') and of the vehicle (17) so that the energy input control means will not follow the individual pulses due to its inertia.

6. System according to claim 3, wherein the positioning means includes a solenoid coil (15);
   a sensing resistor (46) and a free-wheeling diode (45) being connected in parallel with the coil;
   said amplifier (40) forming the pulsed, controlled current source (14) being connected to provide output pulses at a predetermined pulse rate but of varying duty cycles and of predetermined current to the solenoid coil (15), the sensing resistor measuring current flow through the coil including current flowing therethrough during gaps between pulses and conducted through the free-wheeling diode (45), the voltage drop across the sensing resistor (46) providing a sensing signal representative of current flowing in the positioning means (15).

7. System according to claim 6, further comprising an R/C filter (48, 49) having said derived sensing signal applied thereto;
   and a feedback circuit connected to said filter (48, 49) and feeding back the filtered, sensed signal to the input of the controlled current source.

8. System according to claim 6, further comprising a T-filter including two serially connected resistors (48, 60) and a cross capacity (49);
   an operational amplifier (40) forming the input to the pulsed, controlled current source, the output of said T-filter being applied as negative feedback to the operational amplifier (40) to provide proportional-derivative characteristics to said operational amplifier;
   and means (39; 41, 42) controlling the pulsing of the operational amplifier as a function of, and connected to the output voltage of said PD controller (13).

9. System according to claim 6, wherein said controller has proportional-derivative (PD) characteristics.

10. System according to claim 3, wherein said controller has proportional-derivative (PD) characteristics.

* * * * *